UNITED STATES PATENT OFFICE.

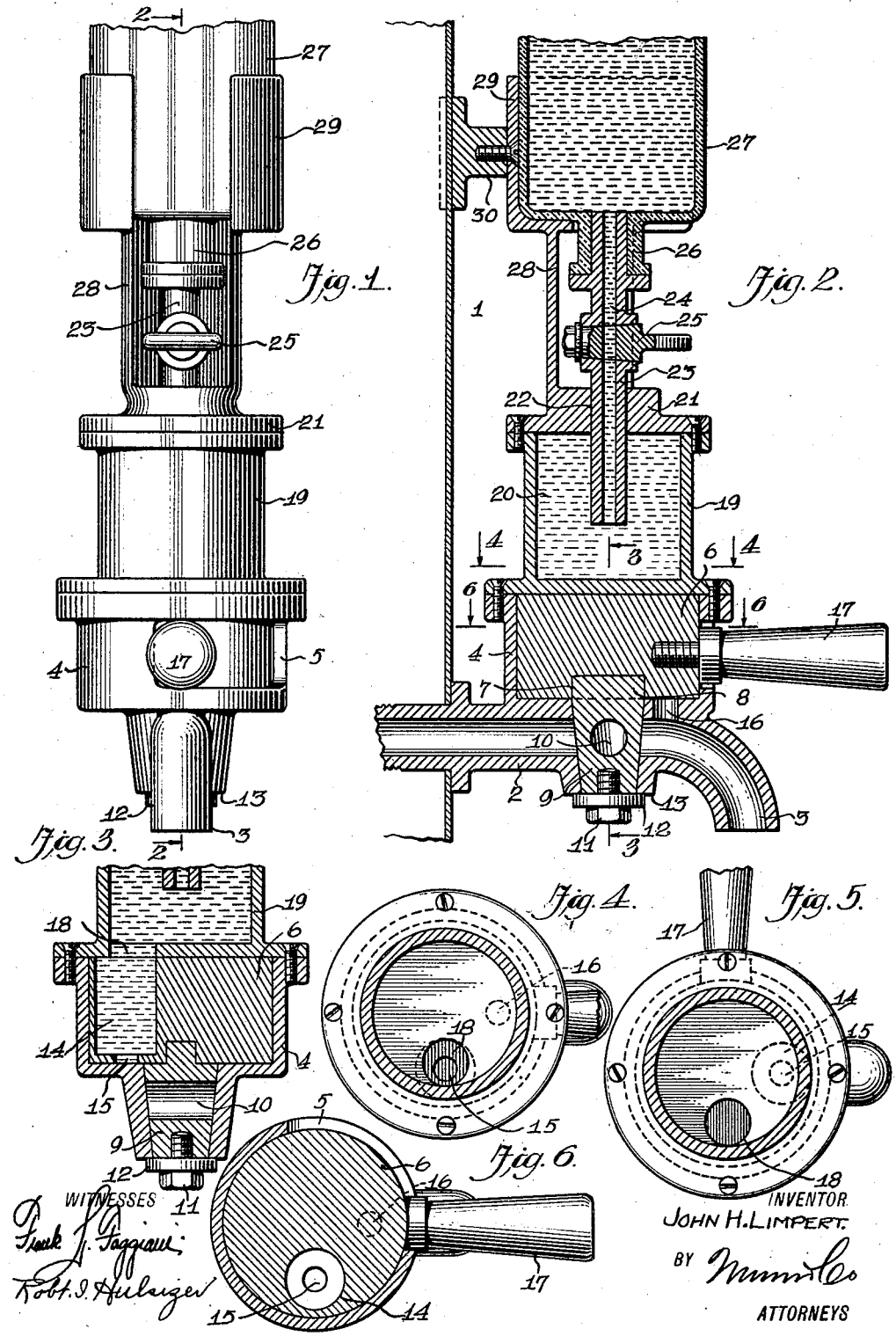

JOHN H. LIMPERT, OF NEW YORK, N. Y.

DISPENSING APPARATUS.

1,387,995. Specification of Letters Patent. Patented Aug. 16, 1921.

Application filed November 5, 1920. Serial No. 422,007.

*To all whom it may concern:*

Be it known that I, JOHN H. LIMPERT, a citizen of the United States, and a resident of the city of New York, borough of Manhattan, in the county and State of New York, have invented a new and Improved Dispensing Apparatus, of which the following is a full, clear, and exact description.

This invention relates to dispensing apparatus, and has particular reference to coffee-dispensing apparatus.

An object of the invention is to provide an apparatus whereby coffee extract may be mixed at will and in desired quantities with boiling water.

Another object of the invention resides in the provision of means whereby the proportions of water and coffee extract can be duly regulated by the manipulation of a single handle portion which controls the flow of both the water and the coffee extract into the receptacles.

A further object resides in the provision of a simple and compact structure which can be readily attached to any type of coffee urn or percolator now on the market.

A still further object of the invention resides in the particular construction and arrangement of parts hereinafter described and claimed and shown in the accompanying drawings.

My invention in general comprises a stand upon which a bottle of coffee extract may be placed. This extract is permitted to flow into a suitable chamber. The hot water with which the extract is to be mixed flows through a faucet. By the manipulation of a single element, which is interposed between the above-mentioned chamber and the passage for the hot water, a measured amount of extract is permitted to flow through the movable element into the hot-water passage to pass out into any suitable receptacle, the resultant mixture of hot water and extract making the coffee. It will, of course, be observed that this device is applicable for the proportionate mixing of any two liquids, not necessarily coffee extract and water.

The invention is illustrated in the drawings, of which—

Figure 1 is a front view of that portion of the apparatus the manipulation of which effects the mixing of the extract and the water;

Fig. 2 is a vertical section taken on the line 2—2 of Fig. 1;

Fig. 3 is a vertical section taken on the line 3—3 of Fig. 2;

Fig. 4 is a horizontal section taken on the line 4—4 of Fig. 2;

Fig. 5 is a section taken on the line 4—4 of Fig. 2 showing the handle portion in a different position; and Fig. 6 is a section taken on the line 6—6 of Fig. 2.

The invention as shown in the drawings is applicable to an urn or receptacle 1, which may contain hot water or any other suitable liquid. A faucet 2 can be attached to this receptacle 1 in any suitable and well-known manner and have a spout 3. Integrally formed on the upper side of the faucet 2 is a cylindrical receptacle or casing 4, the upper end of which is open. A slot 5 is formed in the side of this casing, as shown particularly in Fig. 1. Within this casing 4 a solid cylindrical block 6 is disposed and fits tightly therein. This block has a bore 7 on its lower face into which the upper end 8 of a valve plug 9 is rigidly seated. This valve plug 9 has the usual aperture 10 through which liquid can flow from the urn 1 through the faucet 2 whenever the plug 9 is disposed in the proper position. The plug 9 is tapered and is provided in its lower end with a threaded bore adapted to receive the threaded end of a nut 11 provided with a flange portion 12 bearing against the lower surface 13 of the faucet 2. By tightening the nut 11 the valve plug 9 is firmly seated in the usual manner. This also enables the cylindrical plug 6 to be firmly held on its seat.

The cylindrical plug 6 is provided with a chamber 14 therein. This chamber 14 is adapted to receive a suitable, predetermined quantity of extract, and has in its lower face an aperture or port 15, which, however, is normally closed by the bottom surface of the casing 4. The casing 4 is provided in its lower surface with a port 16, shown in Fig. 2, with which the port 15 is adapted to register when the cylindrical plug 6 is moved by a handle portion 17 into the position in which the ports 15 and 16 are alined with respect to each other. The chamber 14 is adapted to receive coffee extract through a port 18 disposed in the lower surface of a casing 19, which is suitably fastened to the upper open face of the casing 4. This casing 19 has a chamber 20 within which the coffee extract is contained. The upper end of this casing 19 is closed by a plate 21 fastened thereto in any suitable manner. This plate is provided with a bore 22 into which a stem 23 is tightly fit. This stem has an inner passage 24, the flow of liquid through which is controlled by a valve 25. This stem can be inserted in the neck 26 of any suitable bottle or receptacle 27.

The plate 21 is provided with an upstanding web portion 28, the upper end 29 of which is in the form of a U-shaped bracket adapted to receive the bottle or receptacle 27. A connection 30, attached to the side of the bracket 29, may be connected in any suitable manner to the side of the urn 1. In the normal position of the handle portion 17, the ports 15, 16 and 18 are in the relative position shown in Fig. 4. The position of the handle to which it is moved when coffee extract is to be passed to the faucet 3 is shown in Fig. 5, together with the position of the ports.

In the operation of the device, a bottle or receptacle 27, containing the desired extract of liquid, is placed in position as shown in Fig. 2 on the bracket 29, after having previously had the stem 23 inserted in the neck 26 of the bottle. This stem is adapted to tightly fit into the bore 22 and extend into the chamber 20. When the valve 25 is open, liquid flows into the chamber 20 and fills the same. At this time the chamber 14 is in alinement with the port 18 and the liquid, therefore, falls into the chamber 14. However, the port 15 in the bottom of chamber 14 is closed in this position by the bottom surface of casing 4.

When it is desired to admit the water and the coffee extract to a suitable receptacle (not shown), such as a coffee cup, the handle 17 is moved into the position shown in Fig. 5. This movement causes the upper surface of the valve plug 9 to close the port 18 and bring the port 15 in the bottom of chamber 14 in alinement with the port 16 in the bottom of casing 4, whereby the liquid or extract in the chamber 14 is permitted to flow out into the passage in faucet 2. At the same time that this movement of valve plug 6 is taking place, the plug 9 is being moved to permit hot water or other liquid to flow through the passage 10 in this plug 9. It will therefore be seen that by one movement of the handle 17 a measured amount of coffee extract or other liquid is permitted to mix with any desired quantity of hot water. When the ports are returned to the normal position shown in Fig. 4, the passage in the faucet 2 is closed and the chamber 14 is brought back into alinement with the port 18, whereby more extract is permitted to flow into the chamber.

It will, therefore, be observed that I have provided a simple, compact and efficient apparatus which can be readily attached to the side of any urn or other receptacle. The various parts are supported on the faucet 2 and by reason of the connecting member 30 above mentioned. This apparatus is adapted for the ready replacement of the receptacle 27, and is also so constructed as to be readily taken apart and cleaned at any time.

What I claim is:

1. A dispensing apparatus for a liquid receptacle having an outlet passage, comprising a valve in said passage, a liquid chamber associated with said receptacle and adapted to receive liquid from a second receptacle, a second valve associated with said chamber and having a recess of a definite size therein adapted when the valve is in a normal position to receive liquid from said chamber, and means for moving both of the valves to cause the mixture of the liquid from both of said receptacles.

2. A dispensing apparatus for a liquid receptacle having an outlet passage, which comprises means for regulating the flow of liquid through said passage, a second receptacle containing liquid associated with the first-mentioned receptacle, and means associated with the operation of said valve to mix a quantity of liquid from the second receptacle with the liquid from the first receptacle when the valve is operated.

3. A dispensing device for coffee urns having an outlet passage, comprising a chamber adapted to receive coffee extract, a valve associated with said chamber, a second valve in the outlet passage, and a single means for controlling both of said valves to admit the coffee extract into the passage with the liquid from the receptacle.

4. A dispensing apparatus for a liquid receptacle, comprising a faucet attached to said receptacle, a valve in said faucet, a casing attached to said faucet, a valve in said casing having a recess therein of definite size, said valve and said casing having ports adapted when the valve is operated to register with each other, a liquid chamber attached to said casing having a port therein adapted to register with the recess in said valve when the valve is in a normal position, and a support on said chamber adapted to receive a second liquid receptacle.

5. A dispensing apparatus comprising a faucet, a valve in said faucet, a casing attached to said faucet, a plug valve in said casing having a recess therein and a port in the bottom of said recess, connections between the first valve and the plug valve, said casing having a port leading to the faucet out of alinement with the recess when in its normal position, a liquid chamber attached to said casing having an aperture therein in alinement with the recess when the plug valve is in its normal position, a support attached to said liquid chamber, said support adapted to receive a liquid receptacle, and means for operating both of said valves to open the faucet at the same time that the recess in the plug valve is alined with the aperture in the casing.

6. A dispensing apparatus for a liquid receptacle, which comprises a faucet attached to said receptacle, a valve in said faucet, a casing attached to said faucet, a valve in said casing having a recess therein of a definite measured size, said valve and said casing having ports adapted to register with each other when the valve is operated, a liquid chamber attached to said casing having a port therein adapted to register with the recess in the valve when the valve is in a normal position, a bracket on said chamber adapted to receive a liquid container, and means connecting said bracket to the first receptacle.

7. A liquid dispensing apparatus comprising a faucet, a valve in said faucet, a casing on said faucet, a second valve in said casing connected to the first valve, said second valve having a recess of a definite volume, a liquid chamber above said casing having a port therein adapted to register with said recess when said second valve is moved to a definite position, a bracket mounted on said chamber adapted to receive a liquid container, and a stem adapted to be connected to said container whereby the chamber automatically receives liquid from the container as the liquid is fed from the chamber through said second valve into the faucet.

JOHN H. LIMPERT.